United States Patent
Yoon et al.

(10) Patent No.: US 10,232,338 B2
(45) Date of Patent: Mar. 19, 2019

(54) MICRO-CHANNEL REACTOR

(71) Applicant: LG CHEM, LTD., Seoul (KR)

(72) Inventors: Seokhyun Yoon, Daejeon (KR); Young Chang Byun, Daejeon (KR); Jae Hoon Choe, Daejeon (KR); Taehun Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/031,950

(22) PCT Filed: Nov. 19, 2014

(86) PCT No.: PCT/KR2014/011100
§ 371 (c)(1),
(2) Date: Apr. 25, 2016

(87) PCT Pub. No.: WO2015/076546
PCT Pub. Date: May 28, 2015

(65) Prior Publication Data
US 2016/0263546 A1    Sep. 15, 2016

(30) Foreign Application Priority Data

Nov. 25, 2013 (KR) .................... 10-2013-0144069

(51) Int. Cl.
*B01J 19/00* (2006.01)
*B01J 14/00* (2006.01)
(Continued)

(52) U.S. Cl.
CPC ......... *B01J 19/0093* (2013.01); *B01F 5/0641* (2013.01); *B01F 13/0059* (2013.01);
(Continued)

(58) Field of Classification Search
CPC .... B01J 2219/00972; B01J 2219/00977; B01J 19/0093; B01J 2219/00891;
(Continued)

(56) References Cited

U.S. PATENT DOCUMENTS 5,595,712 A    1/1997 Harbster et al.
6,457,854 B1   10/2002 Koop et al.
(Continued)

FOREIGN PATENT DOCUMENTS

CN    101224402 A    7/2008
CN    102325589 A    1/2012
(Continued)

*Primary Examiner* — Amber R Orlando
*Assistant Examiner* — Syed T Iqbal
(74) *Attorney, Agent, or Firm* — Dentons US LLP

(57) ABSTRACT

Disclosed herein is a micro-channel reactor formed by placing a planar upper plate and a planar lower plate, each having a channel formed therein, such that the upper plate and the lower plate face each other, wherein the channel includes one or more introduction channels, into which different fluids are introduced respectively, a mixing channel, along which the fluids introduced into the introduction channels flow in a state in which the fluids join each other, and a discharge channel, from which the fluids joining in the mixing channel are discharged, the mixing channel includes a stem channel extending from the introduction channels to the discharge channel and one or more branch channels that diverge from the stem channel and are then interrupted, and, when the fluids are mixed through repetitive diverging and joining, the fluids diverge in upward and downward directions and then join each other in leftward and rightward directions.

16 Claims, 6 Drawing Sheets

(51) Int. Cl.
*B01F 5/06* (2006.01)
*B01F 13/00* (2006.01)

(52) U.S. Cl.
CPC ....... *B01J 14/00* (2013.01); *B01F 2215/0422* (2013.01); *B01F 2215/0431* (2013.01); *B01J 2219/0086* (2013.01); *B01J 2219/00783* (2013.01); *B01J 2219/00889* (2013.01); *B01J 2219/00894* (2013.01)

(58) Field of Classification Search
CPC .... B01J 2219/00995; B01J 2219/00889; B01J 2219/0097; B01J 2219/0086; B01J 2219/00984; B01J 2219/00783; B01J 2219/00833; B01J 2219/00831; B01L 2300/0867; B01L 2300/0816; B01L 3/502784; B01L 2400/0487; B01L 3/5027; B01L 3/502746; B01L 2200/0673; B01L 3/502715; B01L 2200/0621; B01L 2300/087; B01L 2400/00; B01F 5/0646; B01F 5/0601; B01F 5/0647; B01F 13/0059; B01F 5/0602; Y10T 137/2229; B22F 9/24; B22F 1/10018; B82Y 30/00
See application file for complete search history.

(56) References Cited

U.S. PATENT DOCUMENTS

| | | | |
|---|---|---|---|
| 2007/0017633 A1* | 1/2007 | Tonkovich | B01F 5/0611 156/300 |
| 2007/0110631 A1* | 5/2007 | Ajdari | B01F 5/0601 422/504 |
| 2008/0245184 A1 | 10/2008 | Lee et al. | |

FOREIGN PATENT DOCUMENTS

| | | | | |
|---|---|---|---|---|
| CN | 202893334 U | | 4/2013 | |
| CN | 102553480 B | | 1/2014 | |
| JP | 2001120972 A | | 5/2001 | |
| JP | 2004122107 A | | 4/2004 | |
| JP | 2006122735 A | | 5/2006 | |
| JP | 2007113922 A | | 5/2007 | |
| JP | 2008512237 A | | 4/2008 | |
| JP | 2008264640 A | | 11/2008 | |
| JP | 2009509725 A | | 3/2009 | |
| JP | 2010142798 A | | 7/2010 | |
| JP | 2012-170854 A | | 9/2012 | |
| KR | 10-0658361 B1 | | 12/2006 | |
| KR | 100658361 B1 | * | 12/2006 | |
| KR | 10-2007-0119571 A | | 12/2007 | |
| KR | 20070119571 A | * | 12/2007 | ............ B22F 1/0018 |
| WO | 2006/031058 A1 | | 3/2006 | |

* cited by examiner

【FIG. 1】
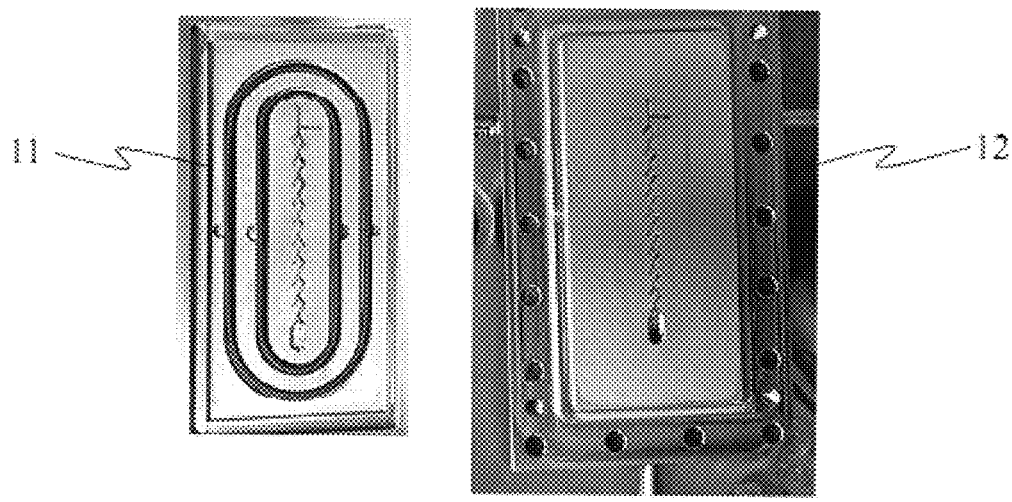
【FIG. 2】
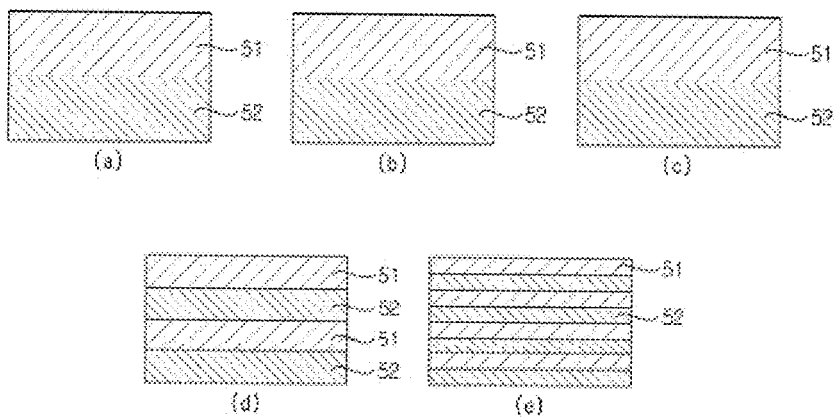

【FIG. 3】
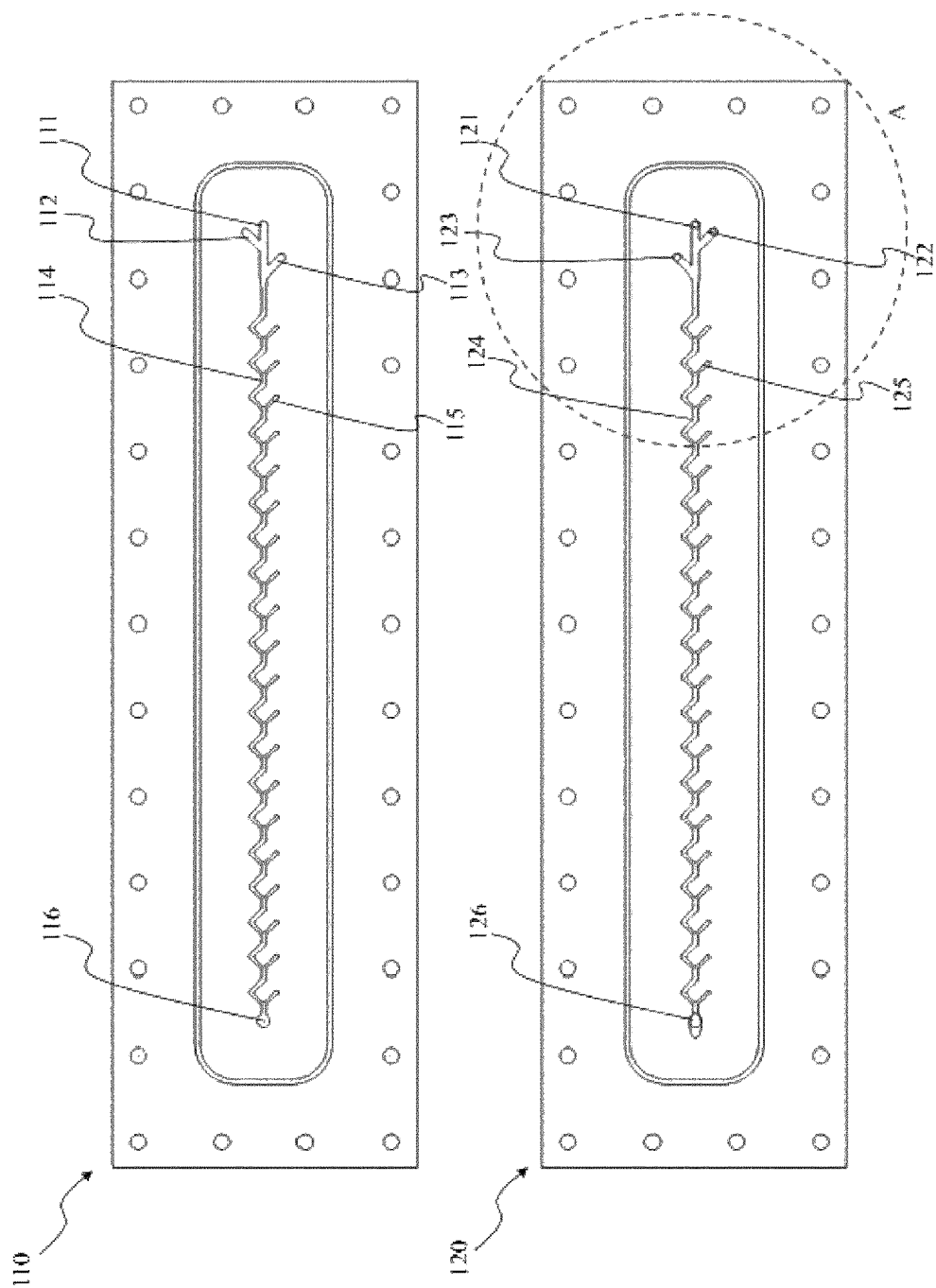

[FIG. 4]
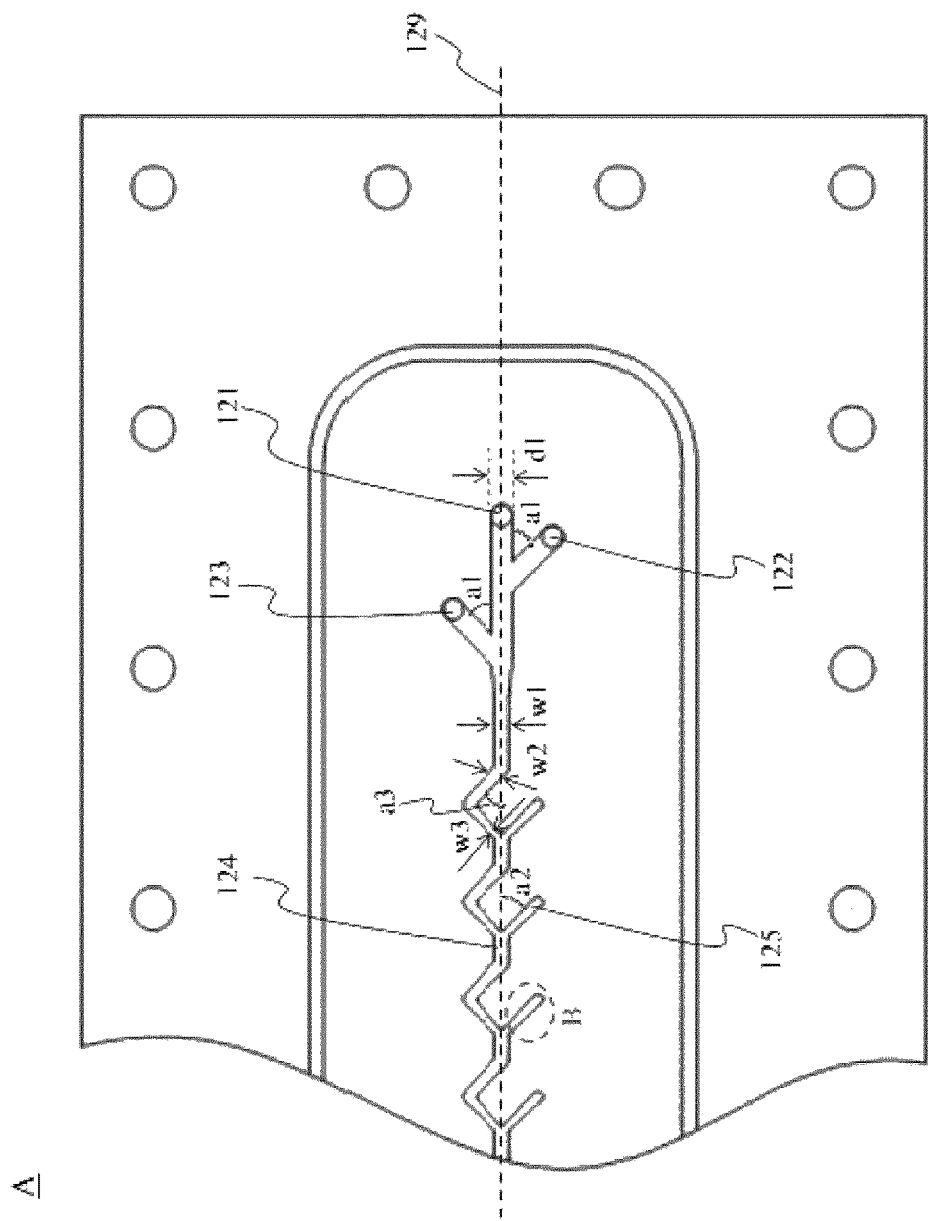

[FIG. 5]
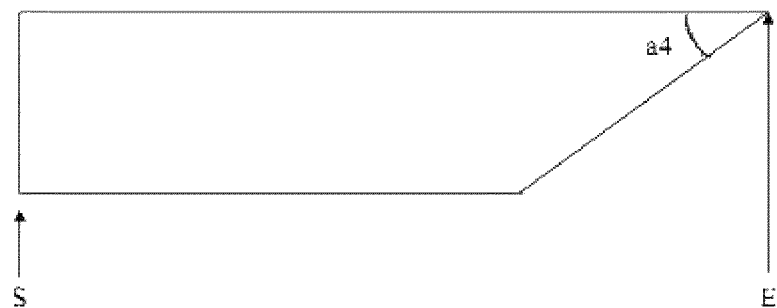

【FIG. 6】
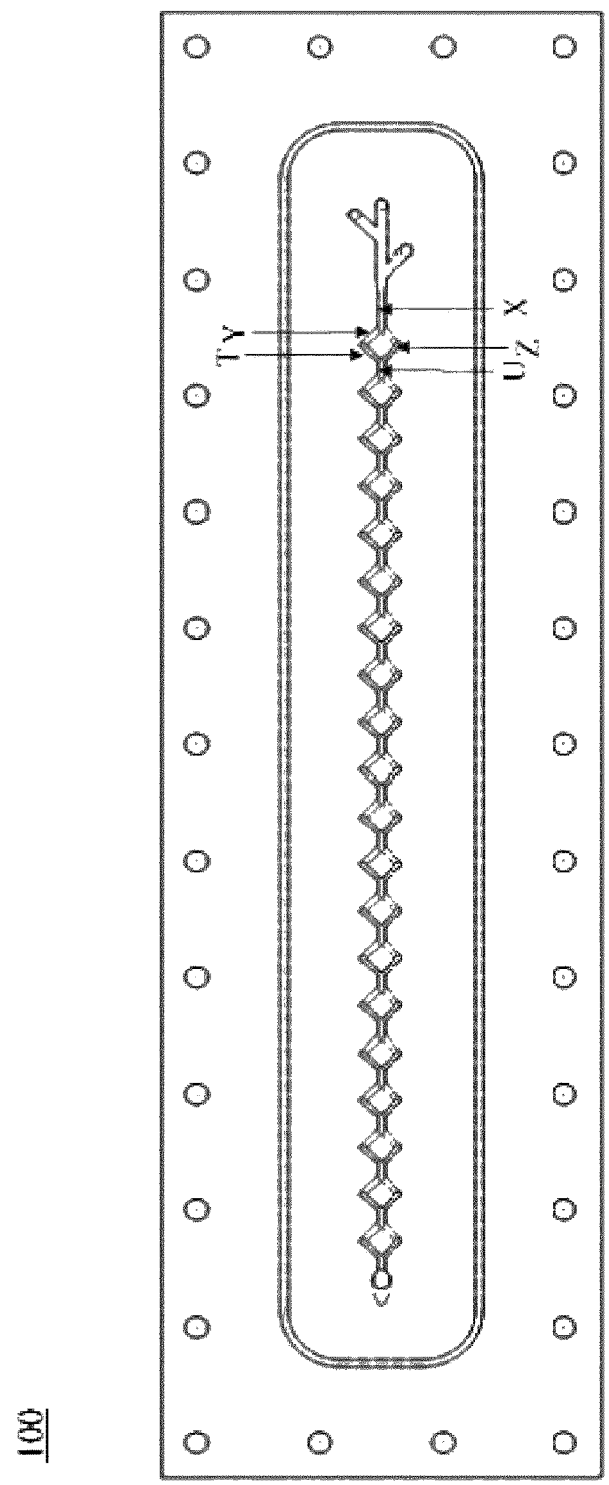

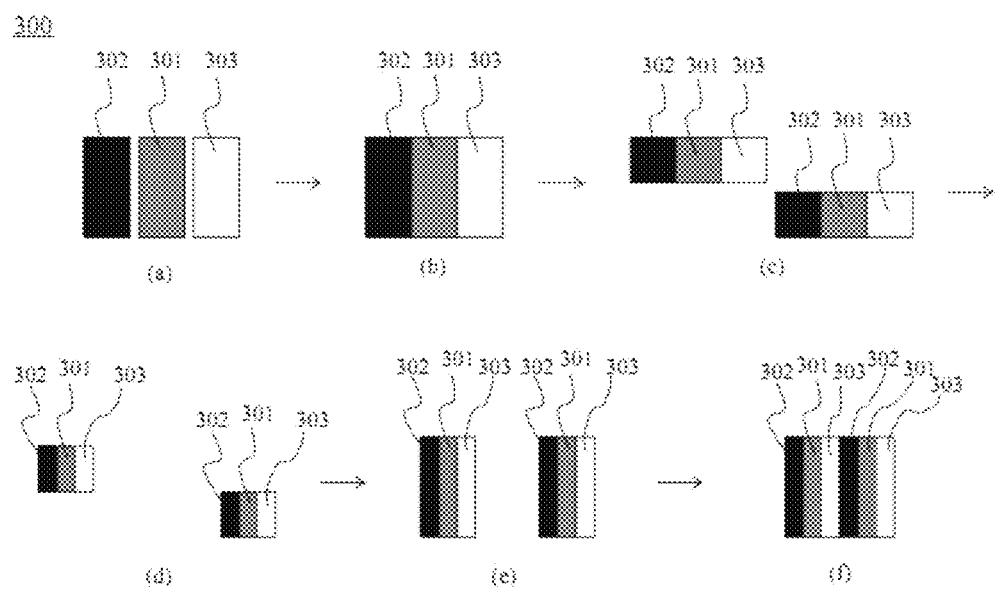
[FIG. 7]

__US 10,232,338 B2__

MICRO-CHANNEL REACTOR

This application is a National Stage Entry of International Application No. PCT/KR2014/011100, filed on Nov. 19, 2014, and claims the benefit of and priority to Korean Application No. 10-2013-0144069, filed on Nov. 25, 2013, both of which are incorporated herein by reference in their entirety for all purposes as if fully set forth herein.

TECHNICAL FIELD

The present invention relates to a micro-channel reactor, and more particularly to a micro-channel reactor having a novel structure that is capable of minimizing the stagnation of fluids and maximizing the mixing of the fluids, whereby it is possible to minimize channel clogging due to the deposition and stagnation of reaction products while achieving high reactant mixing efficiency in a case in which the micro-channel reactor is applied to the synthesis of particles.

BACKGROUND ART

Various kinds of static mixing reactors for mixing at least two kinds of fluids have been proposed. Such static mixing reactors are used to manufacture ultrafine particles through chemical reaction or crystallization. Among the static mixing reactors is a micro-channel reactor for supplying fluids to be mixed into a micro-channel. The micro-channel reactor is attracting attention.

The micro-channel reactor is provided with a micro-channel having a channel width of 10 µm to 1000 µm. In the micro-channel reactor, at least two kinds of fluids diverge and then join each other through the micro-channel. In the micro-channel reactor, the fluids diverge, whereby the distance by which the fluids are diffused is reduced. As a result, the speed by which the fluids are mixed is increased. In the micro-channel reactor, therefore, it is possible to efficiently mix the fluids within a shorter time than when using a conventional static mixing reactor.

A rector having a Y-shaped channel is well known as one example of such a micro-channel reactor. In this type of mixing reactor, a channel into which a first fluid is introduced and a channel into which a second fluid is introduced intersect in a Y shape in order to form a single joining channel. The fluids supplied into the respective channels join each other in a state of laminar flow at a channel intersection part. Subsequently, the respective fluids are diffused and mixed.

FIG. 1 is a photograph showing a conventional stacked type micro-channel reactor.

Referring to FIG. 1, a conventional micro-channel reactor 10 includes an upper plate 11, having a micro-channel in which reactant A flows, and a lower plate 12, having a micro-channel in which reactant B flows. That is, the interface at which the upper plate 11 and the lower plate 12 face each other is provided with an introduction channel, into which fluids are introduced, a mixing channel, in which the direction in which the fluids flows is changed, and in which the fluids are divided into several parts one or more times in order to mix the fluids, and a discharge channel, from which the mixed fluid is discharged. The mixing channel includes a main channel and a branch channel such that, when the upper plate 11 and the lower plate 12 are placed one on another, the fluids alternately flow from the upper plate 11 to the lower plate 12.

In the micro-channel reactor, therefore, the respective fluids are mixed. Mixing behaviors 50 are shown in a typical view of FIG. 2.

Referring to FIG. 2 together with FIG. 1, fluids 51 and 52 introduced into the introduction channel are stacked in a shape as shown in FIG. 2($a$). Subsequently, the mixed fluid diverges at a first diverging part. As a result, some of the mixed fluid flows to the main channel, and the remainder of the mixed fluid flows to the branch channel. Subsequently, the fluids join each other again. Since the branch channel is interrupted, the upper fluid and the lower fluid, stacked in shapes as shown in FIGS. 2($b$) and 2($c$), join each other at the next joining part. As a result, the fluids are stacked as shown in FIG. 2($d$). At the third joining part, the mixed fluid has layers as shown in FIG. 2($e$). As the result of the repetition of the above process, the mixed fluid has $2^n$ layers at the n-th joining part.

In the micro-channel reactor with the above-stated construction, laminar flows, which form interfaces, are alternately arranged one on another through the structure of the channel configured as described above, thereby accelerating mixing of the fluids.

That is, the micro-channel reactor with the above-stated construction is designed to have a structure that is capable of maximizing mixing between reactants, the reaction products being solutions in most cases. For this reason, stagnation of the reaction products is not an issue. For low-viscosity reactants, therefore, it is possible to enable the reactants to continuously react with each other while maximizing mixing of the reactants. However, the channel discontinuously appears and disappears, with the result that the channel is abruptly changed. In a case in which the reaction products are deposited, therefore, the channel may easily become clogged if the channel has a stagnation point. Furthermore, the micro-channel of the micro-channel reactor has a micro structure. As a result, the channel may be easily clogged. Therefore, there is a high necessity for a micro-channel reactor having a novel structure that is capable of preventing stagnation of reaction products while achieving high mixing efficiency in a case in which the reaction products are solid matter, such as nano particles.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that it is possible to minimize the deposition of reaction products at a channel stagnation point and a clogging phenomenon based thereon while achieving high reactant mixing efficiency in a case in which a micro-channel reactor having a novel structure according to the present invention is applied to a reaction in which deposition occurs, as in the synthesis of particles. The present invention has been completed based on these findings.

Technical Solution

In accordance with one aspect of the present invention, the above and other objects can be accomplished by the provision of a micro-channel reactor formed by placing a planar upper plate and a planar lower plate, each having a channel formed therein, such that the upper plate and the lower plate face each other, wherein the channel includes one or more introduction channels, into which different fluids are introduced respectively, a mixing channel, along which the fluids introduced into the introduction channels flow in a state in which the fluids join each other, and a discharge channel, from which the fluids joining in the mixing channel are discharged, the mixing channel includes a stem channel extending from the introduction channels to the discharge channel and one or more branch channels that diverge from the stem channel and are then interrupted, and, when the fluids are mixed through repetitive diverging and joining, the fluids diverge in upward and downward directions and then join each other in leftward and rightward directions.

In general, as previously described, a conventional micro-channel reactor is a staked type micro-channel reactor configured such that fluids diverge in the leftward and rightward directions and then join each other in the upward and downward directions. In a case in which reaction products are solutions, therefore, mixing efficiency is not reduced, and no deposition occurs, in the laminar flows. In the particle forming reaction, however, deposition occurs at the channel part, which is abruptly divided upward and downward, and therefore the clogging phenomenon in the lower plate becomes serious. As a result, mixing efficiency is reduced, and reaction stability is also reduced.

The inventors of the present application have developed a micro-channel reactor having a structure that is optimal for a reaction in which deposition occurs, as in the synthesis of particles. Specifically, in the micro-channel reactor according to the present invention, the fluids diverge in the upward and downward directions and then join each other in the leftward and rightward directions, unlike the conventional micro-channel reactor. Consequently, an intermittently disappearing channel does not exist, with the result that it is possible to minimize stagnation of the fluids. In addition, the fluids naturally diverge and then join each other. In a particle forming reaction, therefore, it is possible to solve the above-mentioned problems while improving mixing efficiency.

Furthermore, in order to further prevent channel clogging due to the deposition phenomenon, the channel may be designed such that the depth of the channel can be continuously changed even in a case in which the channel appears.

Meanwhile, the structure of each of the channels of the micro-channel reactor according to the present invention will be described hereinafter in more detail.

In a concrete example, taking a line interconnecting fluid diverging and joining parts as a central axis, the introduction channels, into which the different fluids are introduced, may include a first introduction channel located on the central axis and one or more second introduction channels located so as to diverge from the central axis by a predetermined angle.

In this case, different fluids may be introduced into the second introduction channels. That is, different fluids may be introduced into the first introduction channel and the second introduction channels. However, the present invention is not limited thereto. According to circumstances, the same fluid or different fluids may be introduced into the introduction channels depending on the desired reaction.

The second introduction channels may diverge from the central axis by an angle of 30 degrees to 60 degrees.

If the second introduction channels diverge from the central axis by an angle of less than 30 degrees, it is difficult to form the channels, which is not preferable. On the other hand, if the second introduction channels diverge from the central axis by an angle of greater than 60 degrees, the fluids may not be naturally mixed. In addition, the flow of the fluids may be stagnated by the bent portions, which is not preferable.

In a concrete example, the introduction channels may have a diameter of 1.5 mm to 5.0 mm. The diameter of the introduction channels is greater than the diameter of the mixing channel, which will be described hereinafter. This is because it is not necessary for the introduction channels to have pressure formed by the flow of the fluids in the mixing channel and it is necessary to reduce the pressure formed by the flow of the fluids such that the fluids can be introduced more easily.

Meanwhile, as previously described, the mixing channel may be divided into a stem channel and branch channels.

The branch channels are added to the stem channel of each of the plates, which face each other, in order to increase the diameter of the stem channel. The branch channels are formed only in a portion of the mixing channel. On the other hand, the stem channel is formed over the entire mixing channel. The stem channel is divided into two sections in which the fluids diverge and join each other.

Specifically, one of the sections is a section in which the fluids join each other, and the other section is a section in which the fluids diverge in the leftward and rightward directions.

In this case, the diameter of the stem channel in the fluid joining section may be 0.5 mm to 1.5 mm, and the diameter of the stem channel in the section in which the fluids diverge leftward and rightward may be 0.5 to 1.0 times the diameter of the stem channel in the fluid joining section.

This is because the diameter of the stem channel in the fluid diverging section must be less than the diameter of the stem channel in the fluid joining section such that the fluids have a uniform diameter when the fluids join each other again.

In order to uniformly maintain the diameter of the stem channel in the fluid joining section, therefore, the diameter of the stem channel in the section in which the fluids diverge leftward and rightward may be gradually reduced toward a fluid joining section. For example, the diameter of the ends of the stem channel, which diverge leftward and rightward may be 0.5 times the diameter of the stem channel in the section in which the fluids join each other.

Meanwhile, the path of the stem channel from the fluid diverging point to the fluid joining point may be symmetric. Taking a line interconnecting fluid diverging and joining parts as a central axis, the branch channels may diverge from the central axis in a state in which the branch channels are symmetric with the stem channel. When the upper plate and the lower plate face each other, therefore, the stem channels and the branch channels overlap each other. At this time, the planar structure formed by the stem channels and the branch channels is not particularly restricted as long as the planar structure is symmetric. For example, the planar structure may have a diamond shape.

In this case, the branch channels may diverge so as to be combined with the stem channels of the plates that face each other at a point of the diverging section such that the fluids diverging in the upward and downward directions can join each other leftward and rightward. In a concrete example, the branch channels may diverge upward from the stem channel toward the introduction channels. Taking a line interconnecting fluid diverging and joining parts as a central axis, a diverging angle of the branch channels may be 10 degrees to 45 degrees.

If the diverging angle is less than 10 degrees, it is difficult to form the channels, which is not preferable. On the other hand, if the diverging angle is greater than 45 degrees, the flow of the fluids may be stagnated by the bent portions, which is not preferable.

Meanwhile, in order to further prevent channel clogging due to the deposition phenomenon, as previously described, the channel depth may be continuously changed such that the channel does not abruptly appear due to the branch channels when the upper plate and the lower plate face each other. Each of the branch channels may include one or more sections having a depth that continuously changes with respect to the surface of each of the plates. The sections having the continuously changed depth may each form a structure that is tapered downward from interrupted points of the branch channels, i.e. the points at which the fluids flowing in the channel meet the branch channels, toward diverging points, i.e. the points at which the fluids flowing in the channel join each other leftward and rightward.

In this case, the downwardly tapered structure may have an inclination of 30 degrees to 45 degrees. If the inclination of the downwardly tapered structure is less than 30 degrees, it is necessary to increase the length of the branch channels until the length of the branch channels becomes equal to the depth of the stem channel in the section in which the fluids join each other, which is inefficient. On the other hand, if the inclination of the downwardly tapered structure is greater than 45 degrees, the fluids may stagnate immediately under the abruptly inclined part, with the result that particles may be deposited, which is not preferable.

Finally, the fluids, introduced into the introduction channels and uniformly mixed along the mixing channel, are discharged through the discharge channel. The discharge channel may have a diameter of 1.5 mm to 5.0 mm, which is greater than the diameter of the mixing channel, such that the mixed fluids can be smoothly discharged without being clogged.

In accordance with another aspect of the present invention, there is provided a method of synthesizing nano particles using the micro-channel reactor. In accordance with a further aspect of the present invention, there are provided nano particles manufactured using the above method.

The method of synthesizing nano particles may be achieved by introducing a reactant, distilled water, and a reducer into the one or more introduction channels of the micro-channel reactor and making the fluids join each other in leftward and rightward directions along the mixing channel of the micro-channel reactor.

When the nano particles are manufactured as described above, it is possible to stably yield the nano particles without clogging of the reactor due to the deposition of the particles. In addition, it is possible to prevent loss attributable to deposition in the reactor. Consequently, the yield of the nano-channel reactor according to the present invention is higher than that of a conventional nano-channel reactor.

DESCRIPTION OF DRAWINGS

The above and other objects, features and other advantages of the present invention will be more clearly understood from the following detailed description taken in conjunction with the accompanying drawings, in which:

FIG. 1 is a photograph showing a conventional stacked type micro-channel reactor;

FIG. 2 is a sectional typical view showing mixing behaviors which occur in respective parts of the conventional stacked type micro-channel reactor;

FIG. 3 is a typical view showing an upper plate and a lower plate of a micro-channel reactor according to the present invention;

FIG. 4 is an enlarged typical view showing part A of the lower plate of FIG. 3;

FIG. 5 is a side typical view showing a channel depth profile of part B of FIG. 4;

FIG. 6 is a typical view showing the upper plate and the lower plate of FIG. 3 in a state in which the upper plate and the lower plate face each other; and FIG. 7 is a sectional typical view showing mixing behaviors which occur in respective parts of the micro-channel reactor of FIG. 6.

BEST MODE

Now, preferred embodiments of the present invention will be described in detail with reference to the accompanying drawings. It should be noted, however, that the scope of the present invention is not limited by the illustrated embodiments.

FIG. 3 is a typical view showing an upper plate and a lower plate of a micro-channel reactor according to an embodiment of the present invention, and FIG. 4 is an enlarged typical view showing part A of the lower plate of FIG. 3. In the following description, a fluid introduced into a first introduction channel will be referred to as a first fluid, and fluids introduced into second introduction channels will be referred to as a second fluid and a third fluid, for the sake of convenience.

Referring first to FIG. 3, the micro-channel reactor according to the present invention includes an upper plate 110 and a lower plate 120. The upper plate 110 and the lower plate 120 are provided with a first introduction channel 111 and 121 and second introduction channels 112, 113, 122, and 123, into which different fluids are introduced, a mixing channel, in which the respective fluids introduced into the introduction channels 111, 112, 113, 121, 122, and 123 flow in a state in which the fluids join one another, and a discharge channel 116 and 126, from which the fluids joining in the mixing channel are discharged. The mixing channel includes a stem channel 114 and 124 extending from the introduction channels 111, 112, 113, 121, 122, and 123 to the discharge channel 116 and 126 and one or more branch channels 115 and 125, which diverge from the stem channel 114 and 124 and are then interrupted.

Hereinafter, the introduction channels and the mixing channel will be described in detail with reference to FIG. 4.

First, the introduction channels 121, 122, and 123 will be described. The first introduction channel 121 is located on a central axis 129 interconnecting fluid diverging and joining parts, and the second introduction channels 122 and 123 are located so as to diverge from the central axis 129 by an angle a1 of 30 degrees to 60 degrees.

The introduction channels 121, 122, and 123 have a diameter d1 of 1.5 mm to 5.0 mm, which is greater than the average diameter of the mixing channel, in order to reduce the pressure generated by the flow of the fluids such that the fluids can be introduced more easily.

The mixing channel includes a stem channel 124 and a branch channel 125. The path of the stem channel 124 from a fluid diverging point to a fluid joining point is symmetric, and the branch channel 125 diverges upward from the central axis 129 in a state in which the branch channel 125 is symmetric with the stem channel 124. A diverging angle a2 of the branch channel 125 is 10 degrees to 45 degrees relative to the central axis 129. The stem channel 124, which is symmetric with the branch channel 125, is bent at an angle a3 of 10 degrees to 45 degrees. When the upper plate 110 and the lower plate 120 face each other, therefore, the stem channels and the branch channels overlap each other. At this time, the planar structure formed by the stem channels and the branch channels is not particularly restricted as long as the planar structure is symmetric. For example, as shown in FIG. 6, the planar structure may have a diamond shape.

Referring back to FIG. 4, the stem channel 124 may be mainly divided into two sections based on whether the fluids diverge and join each other.

The stem channel 124 has different diameters in different sections. Specifically, a diameter w1 of the stem channel 124 in a section in which the fluids join each other is different from diameters w2 and w3 of the stem channel 124 in sections in which the fluids diverge leftward and rightward.

The diameter w1 of the stem channel 124 in the section in which the fluids join each other is 1.5 mm, and the diameters w2 and w3 of the stem channel 124 in the sections in which the fluids diverge leftward and rightward are 0.5 to 1.0 times the diameter w1 of the stem channel 124 in the section in which the fluids join each other.

The diameters w2 and w3 of the stem channel 124 in the sections in which the fluids diverge leftward and rightward will be described in more detail. The diameter w2 of the stem channel in a leftward and rightward diverging section adjacent to a first fluid joining section is 1.0 times the diameter w1 of the stem channel 124 in the section in which the fluids join each other. The diameter w3 of the stem channel in a leftward and rightward diverging section adjacent to a second fluid joining section is 0.5 times the diameter w1 of the stem channel 124 in the section in which the fluids join each other. That is, the diameter of the stem channel is gradually reduced from the section of the stem channel adjacent to the first fluid joining section to the section of the stem channel adjacent to the second fluid joining section.

The branch channels 215, which are symmetric with the stem channel 214, have different diameters such that the branch channels 215 correspond to the stem channel.

When the mixing channel is configured as described above, the diameter w1 of the stem channel 124 in the section in which the fluids join each other is maintained uniformly over the mixing channel. As a result, uniform amounts of fluids flow in the micro-channel reactors.

FIG. 5 is a side typical view showing a channel depth profile of part B of FIG. 4.

Referring to FIG. 5, the depth profile of the branch channel 215 is configured to have a structure in which the branch channel 215 is tapered downward from an end point E of the branch channel 215, i.e. a point at which fluids flowing in the channel first meet a branch channel, to a diverging point S, i.e. a point at which fluids flowing in the channel join each other at the left side and the right side. In this case, the downwardly tapered structure has an inclination a4 of 30 degrees to 45 degrees. In this specification, only the branch channel of the lower plate is shown. The branch channel of the upper plate may have the same shape as the branch channel of the lower plate.

In the micro-channel reactor configured to have the above-stated construction, the channel does not abruptly appear due to the branch channels when the upper plate and the lower plate face each other, thereby more effectively preventing the occurrence of a channel clogging phenomenon attributable to the deposition of particles in the abrupt channel forming portion.

FIG. 6 is a typical view showing a micro-channel reactor 100 in a state in which the upper plate and the lower plate of FIG. 3 face each other, and FIG. 7 is a sectional typical view showing mixing behaviors 300 which occur in respective parts of the micro-channel reactor of FIG. 6.

Hereinafter, a process in which fluids diverge from each other and join each other in the micro-channel reactor 100 will be described with reference to FIGS. 6 and 7.

Referring first to FIG. 6, as previously described, the micro-channel reactor 100 according to the present invention is configured such that the planar structure formed by the stem channels and the branch channels includes diamond-shaped mixing channels. Fluids are mixed in the diamond-shaped mixing channels. FIG. 7 shows only mixing behaviors 300 of fluids before and after the first diamond-shaped mixing channel.

Referring to FIG. 7 together with FIG. 6, a first fluid 301 is introduced into a first introduction channel of FIG. 6, and a second fluid 302 and a third fluid 303 are introduced into second introduction channels of FIG. 6. The fluids flow along a channel of the micro-channel reactor, as shown in FIG. 7(a). When the first fluid 301 is introduced into the first introduction channel, and the second fluid 302 and the third fluid 303 are introduced into the second introduction channels, the fluids join each other in leftward and rightward directions, as shown in FIG. 7(b), before the fluids are introduced into a mixing channel.

Subsequently, the fluids mixed as shown in FIG. 7(b) diverge at a first diverging part, i.e. a Y section, in upward and downward directions, as shown in FIG. 7(c), such that some of the mixed fluid flows to a stem channel of the upper plate and the remainder of the mixed fluid flows to a stem channel of the lower plate. The diverging fluid flows along the stem channel, which is bent at a predetermined angle. The diameter of the stem channel in the section in which the fluids diverge is gradually reduced from the diverging point. In section Z, the mixed fluid has a shape as shown in FIG. 7(d).

The fluids diverging to the upper plate and the lower plate and flowing along the upper plate and the lower plate reach branch channels of the plates that face each other. Consequently, the mixed fluid, which has diverged in the upward and downward directions, flows in leftward and rightward directions, as shown in FIG. 7(e), in section T. As a result, the fluids join each other in section U, which is a second joining section, as shown in FIG. 7(f).

As the fluids flow along the diamond-shaped mixing channels as described above, the mixed fluid discharged from the last discharge channel is mixed a number of times equal to the number n of the diamond shapes. As a result, 2n mixed fluids, each of which has the shape shown in FIG. 7(b), join each other.

That is, in the micro-channel reactor according to the present invention, the fluids naturally diverge in the upward and downward directions and then join each other in the leftward and rightward directions. Consequently, a discontinuously disappearing channel does not exist, with the result that the fluids are effectively mixed while stagnation of the fluids is minimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a micro-channel reactor according to the present invention is designed to have a novel structure that is capable of minimizing the stagnation of fluids and maximizing the mixing of the fluids, whereby it is possible to minimize the deposition of reaction products at a channel stagnation point and a clogging phenomenon based thereon while achieving high reactant mixing efficiency, thus maximizing reaction stability, in a case in which the micro-channel reactor according to the present invention is applied to a reaction in which deposition occurs, as in the synthesis of particles.

The invention claimed is:

1. A micro-channel reactor formed by placing a planar upper plate and a planar lower plate, each having a channel formed therein, such that the upper plate and the lower plate face each other, wherein
the channel comprises one or more introduction channels, into which different fluids are introduced respectively, a mixing channel, along which the fluids introduced into the introduction channels flow in a state in which the fluids join each other, and a discharge channel, from which the fluids joining in the mixing channel are discharged,
the mixing channel comprises a stem channel extending from the introduction channels to the discharge channel and one or more branch channels that diverge from the stem channel and are then interrupted, and configured such that the fluids diverge in upward and downward opposing leftward and rightward directions, and then join each other from leftward and rightward directions in mixing the fluids through repetitive diverging and joining,
the upper plate and the lower plate face each other, the stem channel of the upper plate and the branch channels of the lower plate overlap each other, and the stem channel of the upper plate and the stem channel of the lower plate do not overlap each other between a fluid diverging point and a fluid joining point, and
wherein each of the branch channels comprises one or more sections having a depth that continuously changes with respect to a surface of each of the plates, and wherein the sections having the continuously changed depth each has a structure that is tapered downward from interrupted points of the branch channels toward diverging points.

2. The micro-channel reactor according to claim 1, wherein, taking a line interconnecting fluid diverging and joining parts as a central axis, the introduction channels comprise a first introduction channel located on the central axis and one or more second introduction channels located so as to diverge from the central axis by a predetermined angle.

3. The micro-channel reactor according to claim 2, wherein different fluids are introduced into the second introduction channels, respectively.

4. The micro-channel reactor according to claim 2, wherein the second introduction channels diverge from the central axis by an angle of 30 degrees to 60 degrees.

5. The micro-channel reactor according to claim 1, wherein the introduction channels have a diameter of 1.5 mm to 5.0 mm.

6. The micro-channel reactor according to claim 1, wherein a diameter of the stem channel in a fluid joining section is 0.5 mm to 1.5 mm.

7. The micro-channel reactor according to claim 1, wherein a diameter of the stem channel in a section in which the fluids diverge leftward and rightward is 0.5 to 1.0 times a diameter of the stem channel in a fluid joining section.

8. The micro-channel reactor according to claim 7, wherein the diameter of the stem channel in the section in which the fluids diverge leftward and rightward is gradually reduced toward a fluid joining section.

9. The micro-channel reactor according to claim 1, wherein a path of the stem channel from a fluid diverging point to a fluid joining point is symmetric.

10. The micro-channel reactor according to claim 1, wherein, taking a line interconnecting fluid diverging and joining parts as a central axis, the branch channels diverge from the central axis in a state in which the branch channels are symmetric with the stem channel.

11. The micro-channel reactor according to claim 1, wherein the branch channels diverge upward from the stem channel toward the introduction channels.

12. The micro-channel reactor according to claim 1, wherein, taking a line interconnecting fluid diverging and joining parts as a central axis, a diverging angle of the branch channels is 10 degrees to 45 degrees.

13. The micro-channel reactor according to claim 1, wherein the sections having the continuously changed depth are formed at interrupted points of the branch channels.

14. The micro-channel reactor according to claim 1, wherein the downwardly tapered structure has an inclination of 30 degrees to 45 degrees.

15. The micro-channel reactor according to claim 1, wherein the discharge channel has a diameter of 1.5 mm to 5.0 mm.

16. A method of synthesizing nano particles using a micro-channel reactor of claim 1, wherein
the micro-channel reactor is formed by placing a planar upper plate and a planar lower plate, each having a channel formed therein, such that the upper plate and the lower plate face each other,
the channel comprises one or more introduction channels, into which different fluids are introduced respectively, a mixing channel, along which the fluids introduced into the introduction channels flow in a state in which the fluids join each other, and a discharge channel, from which the fluids joining in the mixing channel are discharged,
the mixing channel comprises a stem channel extending from the introduction channels to the discharge channel and one or more branch channels that diverge from the stem channel and are then interrupted,
the upper plate and the lower plate face each other, the stem channel of the upper plate and the branch channels of the lower plate overlap each other, and vice versa, and the stem channel of the upper plate and the stem channel of the lower plate do not overlap each other between a fluid diverging point and a fluid joining point, and
a reactant, distilled water, and a reducer are introduced into the one or more introduction channels, respectively, and the fluids diverge in upward and downward opposing leftward and rightward directions, and then join each other from leftward and rightward directions.

* * * * *